United States Patent
Roberts (10) Patent No.: US 8,668,416 B2
(45) Date of Patent: Mar. 11, 2014

(54) AIR CARGO ROLLOUT STOP

(75) Inventor: Aaron J. Roberts, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 390 days.

(21) Appl. No.: 12/881,932

(22) Filed: Sep. 14, 2010

(65) Prior Publication Data

US 2011/0002752 A1 Jan. 6, 2011

Related U.S. Application Data

(62) Division of application No. 11/777,666, filed on Jul. 13, 2007, now Pat. No. 7,854,579.

(51) Int. Cl.
*B60P 7/08* (2006.01)

(52) U.S. Cl.
USPC .................................. 410/94; 410/69; 410/79

(58) Field of Classification Search
USPC .......... 410/94, 69, 77, 78, 79, 95; 244/118.1, 244/137.1; 248/351
See application file for complete search history.

(56) References Cited

U.S. PATENT DOCUMENTS

| | | | |
|---|---|---|---|
| 3,796,397 A | 3/1974 | Alberti | |
| 4,557,648 A | 12/1985 | Koch et al. | |
| 4,696,609 A * | 9/1987 | Cole | 410/69 |
| 4,993,899 A | 2/1991 | Engel et al. | |
| 5,004,387 A | 4/1991 | Jensen et al. | |
| 5,178,346 A | 1/1993 | Beroth | |
| 5,265,991 A * | 11/1993 | Herrick et al. | 410/69 |
| 5,486,077 A | 1/1996 | Nutting | |
| 5,692,862 A * | 12/1997 | Hilde | 410/69 |
| 5,823,727 A | 10/1998 | Lee | |
| 6,413,029 B1 | 7/2002 | Kemkamp | |
| 6,557,800 B2 | 5/2003 | Medina et al. | |
| 6,896,456 B2 | 5/2005 | Huber | |
| 2007/0086870 A1 | 4/2007 | Schulze et al. | |

FOREIGN PATENT DOCUMENTS

DE 10 2006 048 405 A1 5/2007

OTHER PUBLICATIONS

Official Action (DE Appln. No. 10 2008 030 556.1-22) issued May 3, 2010 and English Translation.

* cited by examiner

*Primary Examiner* — Stephen Gordon
(74) *Attorney, Agent, or Firm* — Cantor Colburn LLP (57) ABSTRACT

A cargo rollout stop includes a base having a first end and a second end. A first guide head is movably mounted to the base proximate to the first end, and a second guide head is movably mounted to the base proximate to the second end. The guide heads each are movable between a raised blocking position and a lowered non-blocking position. A blocking member is movably mounted to the base, and is disposed between the guide heads. The blocking member includes a first portion engaged with the first guide head, and a second portion engaged with the second guide head, and is movable between a first position and a second position. The first and second portions prevent substantial downward movement of the guide heads when the guide heads are in their raised blocking positions and the blocking member is in its first position. The guide heads are restrained in their lowered non-blocking positions by the blocking member when the blocking member is in its second position.

16 Claims, 8 Drawing Sheets

AIR CARGO ROLLOUT STOP

RELATED APPLICATIONS

This application is a divisional of U.S. application Ser. No. 11/777,666 filed Jul. 13, 2007, now U.S. Pat. No. 7,854,579, the content of which is incorporated by reference in its entirety.

FIELD OF THE INVENTION

The invention relates to aircraft cargo loading and unloading systems, and more particularly, relates to a rollout stop for selectively blocking unwanted movement of a cargo container or pallet in an aircraft.

BACKGROUND

A principle design goal associated with cargo aircraft is minimizing the time required to load and unload cargo containers to and from an aircraft's cargo compartment. Aircraft cargo normally is pre-packaged in or on specially designed containers or pallets known as unit load devices (hereinafter "ULDs") that are sized and shaped to occupy substantially all available space within the cargo compartment of an aircraft. A modern aircraft's cargo compartment typically includes a cargo deck equipped with a plurality of ball mats positioned proximate to the aircraft's cargo door. The ball mats facilitate rolling movement of the ULDs through the door and into and out of the cargo compartment. Aircraft cargo decks also typically include roller trays that extend in fore and aft directions, and that facilitate rolling fore and aft movement of ULDs between the area proximate to the cargo door and various cargo stowage positions within the cargo compartment. In many modern cargo aircraft, ULDs can be loaded through the aircraft's nose section and through at least one side cargo door.

During loading and unloading operations, an aircraft's cargo deck may not be perfectly level, or can change from a level condition to a non-level condition as cargo is loaded or unloaded to and from the aircraft. In certain situations, an aircraft's cargo deck can slope in a direction that permits an unattended ULD to roll downhill toward the aircraft's open cargo door. In order to prevent an unattended ULD from rolling out of a cargo compartment through an open cargo door, cargo aircraft often include one or more blocking devices (hereinafter "rollout stops") that can be incrementally spaced along the sill of the cargo door. In operation, such rollout stop devices act like one-way gates that permit intended movement of a ULD through an open cargo door and into an aircraft's cargo hold, and also prevent unintended rolling movement of a ULD out of the aircraft's cargo door.

Various types of rollout stops are known for blocking unwanted outward rolling movement of ULDs. Generally, such devices include one or more retractable guide heads that can be selectively raised to a height above the cargo deck that is sufficient to block outward rolling movement of a ULD through a cargo door. Typically, such retractable guide heads have a generally upwardly and inwardly sloping top surface that is contacted by the leading lower edge and bottom surface of a ULD as the ULD passes over the stop and into a cargo hold, thereby forcing the upright guide head to retract as the ULD passes over the guide head and into the cargo hold. Commonly, the retractable guide heads are upwardly biased by one or more springs that maintain the guide heads in a raised position until the guide heads are forced to retract by an inwardly moving ULD. Once an inwardly moving ULD passes over the rollout stop, the springs return the guide head to a raised position, thereby generally preventing the just-loaded ULD from rolling in a reverse direction through the open cargo door. Accordingly, such rollout stops can be described as being "over-ridable" in an inward direction, and as being generally "non-over-ridable" in an outward direction. In order to permit ULDs to be unloaded from a cargo compartment without obstruction, the retractable guide heads generally are configured to be selectively latched or otherwise restrained in a lowered, non-blocking position when not in use.

Though prior art rollout stops can be effective to prevent outward rolling movement of most ULDs, the lower edges of a ULD can become warped from use. In some cases, if a lower trailing edge of a ULD is sufficiently upwardly bent, the lower trailing edge can be at an elevation that is sufficiently high to at least partially extend over a raised guide head as the ULD approaches the rollout stop in an outward direction. Accordingly, the warped lower trailing edge and bottom surface of the ULD may force the guide downward as the ULD passes over the stop in an outward direction, thereby undesirably overriding the rollout stop in the outward direction.

Accordingly, there is a need for a rollout stop apparatus that minimizes the likelihood of being overridden by a ULD passing in an outward direction. Preferably, such a device should be relatively simple in construction such that production and repair costs are minimized.

SUMMARY

A cargo rollout stop can include a base having a first end and a second end. A first guide head can be pivotally mounted to the base proximate to its first end, and a second guide head can be pivotally mounted to the base proximate to its second end. The first and second guide heads each are movable between a raised blocking position and a lowered non-blocking position. A retraction pedal can be pivotally mounted to the base, and be disposed between the first and second guide heads. The pedal can include a first portion engaged with the first guide head, and a second portion engaged with the second guide head, and can be movable between a first position and a second position. The first and second portions of the retraction pedal can prevent substantial downward movement of the first and second guide heads when the first and second guide heads are in their raised blocking positions and the pedal is in its first position. In addition, the first and second guide heads can be restrained in their lowered non-blocking positions by the pedal when the pedal is in its second position.

In addition, a cargo rollout stop for an aircraft can include first and second guide heads. Each guide head can be movable between a stopping position and an inactive position. The rollout stop can further include means for supporting the means for stopping. The means for supporting can be selectively movable between a support position and a retracted position. When the means for supporting is in its support position, the first and second means for stopping can be fixed in their respective stopping positions. When the means for supporting is in its retracted position, the first and second means for stopping can be at least partially restrained in their respective inactive positions by the means for supporting.

In one embodiment of the invention, a cargo rollout stop can include a plurality of guide heads that are each movable between a blocking position and a retracted position. At least one interconnecting member is disposed between the guide heads, and causes the moveable guide heads to move together between their blocking positions and their retracted positions.

A method of selectively preventing a cargo container or pallet from unwanted movement can include providing at least one selectively retractable guide head proximate to a cargo deck and adjacent to the cargo door. The method can further include raising the guide head to a cargo stopping position, and blocking retraction of the guide head away from its cargo stopping position due to contact between the guide head and an outwardly moving cargo container. The method also includes permitting retraction of the guide head away from its cargo stopping position as the result of contact between the guide head and an inwardly moving cargo container.

These and other aspects of the invention will be apparent from a reading of the following detailed description together with the drawings.

DETAILED DESCRIPTION

One embodiment of a rollout stop according to the invention is shown in FIGS. 1-8. As shown in FIGS. 1-8, a rollout stop 10 can include a base 20, first and second guide heads 30, 40 pivotally mounted to the base 20, and a retraction pedal 50 disposed between the first and second guide heads 30, 40, and pivotally mounted to the base 20. The first and second guide heads 30, 40 and the retraction pedal 50 are shown in their fully raised positions in FIGS. 1, 3, 5 and 7, and are shown in their fully lowered or retracted positions in FIGS. 2, 4, 6 and 8.

Figure 1:
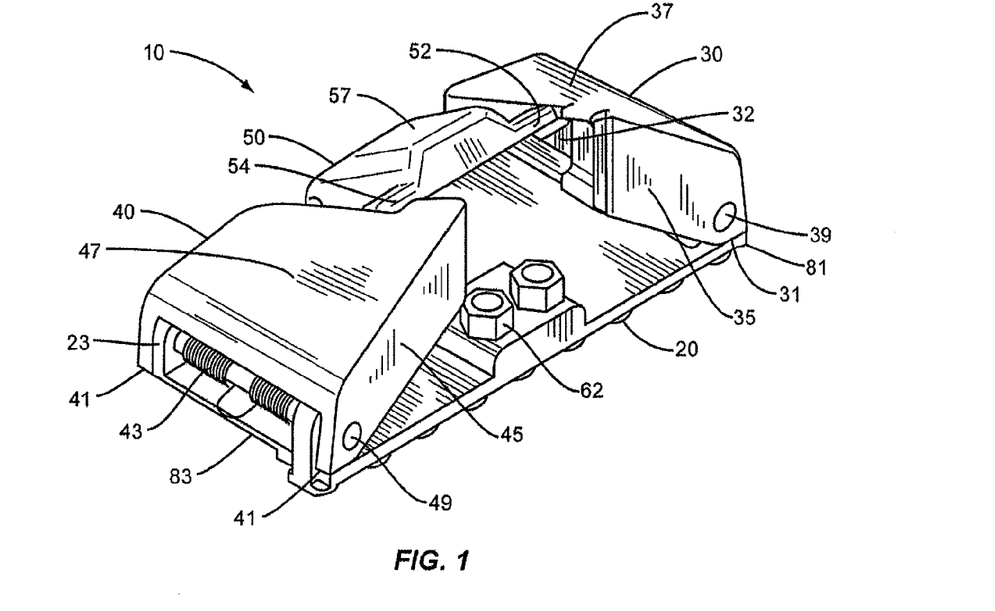
FIG. 1 is a top inboard perspective view of one embodiment of a rollout stop according to the invention in a raised, blocking position.
Figure 2:
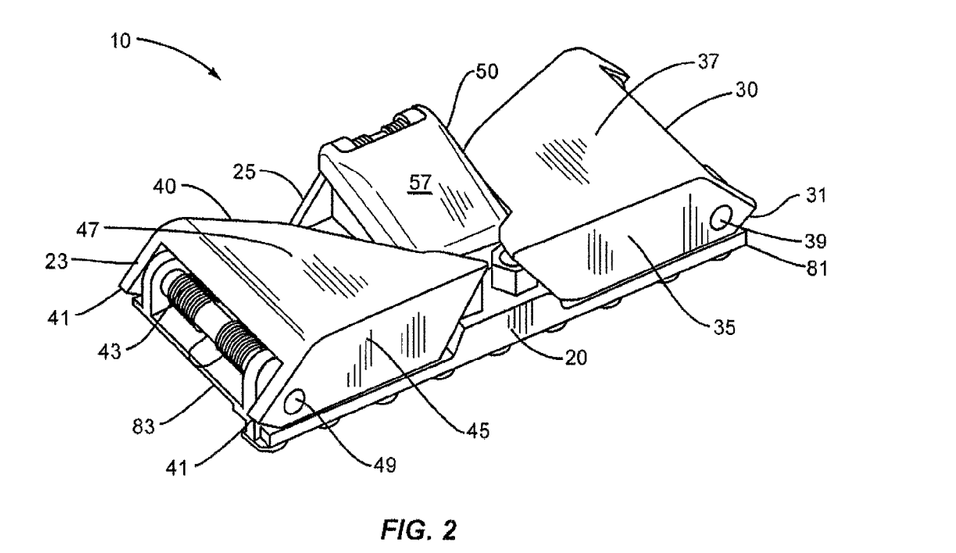
FIG. 2 is a top inboard perspective view of the rollout stop of FIG. 1 in a retracted, non-blocking position.

Referring to FIG. 1, the first guide head 30 can be movably mounted to the base 20 by a first hinge pin 39 engaged in opposed brackets 23 located at or proximate to a first end 81 of the base 20. Similarly, the second guide head 40 can be movably mounted to the base 20 by a second hinge pin 49 engaged in opposed brackets 23 located at or proximate to a second end 83 of the base 20. As shown in FIGS. 1-4, springs 43 can be arranged to push the first and second guide heads 30, 40 away from the base 20 and toward their raised positions. As best seen in FIG. 5, the upward rotational displacement of the guide heads 30, 40 can be limited by pressing contact between their respective base ends 31, 41 and adjacent upper surfaces of the base 20. In the embodiment shown in the figures, the guide heads 30, 40 are pivotally mounted to the base 20 by hinge pins 39, 49. Alternatively, the guide heads 30, 40 can be otherwise movably mounted to the base 20 in any manner that facilitates upward and downward movement of the guide heads 30, 40 relative to the base 20. For example, the guide heads 30, 40 can be connected to the base 20 by a linkage system, such as a four-bar linkage system (not shown in the figures).

Figure 11:
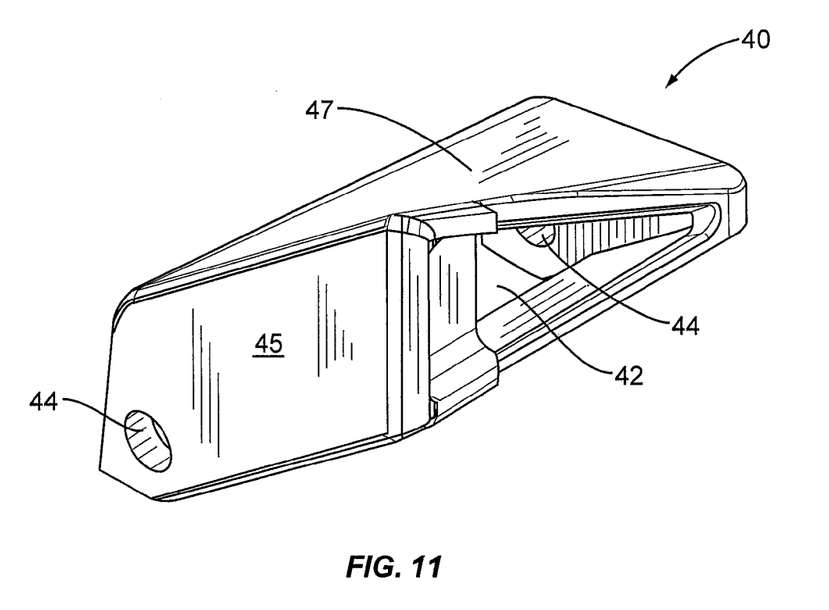
FIG. 11 is a top inboard view of a first guide head portion of the rollout stop shown in FIGS. 1-8.
Figure 12:
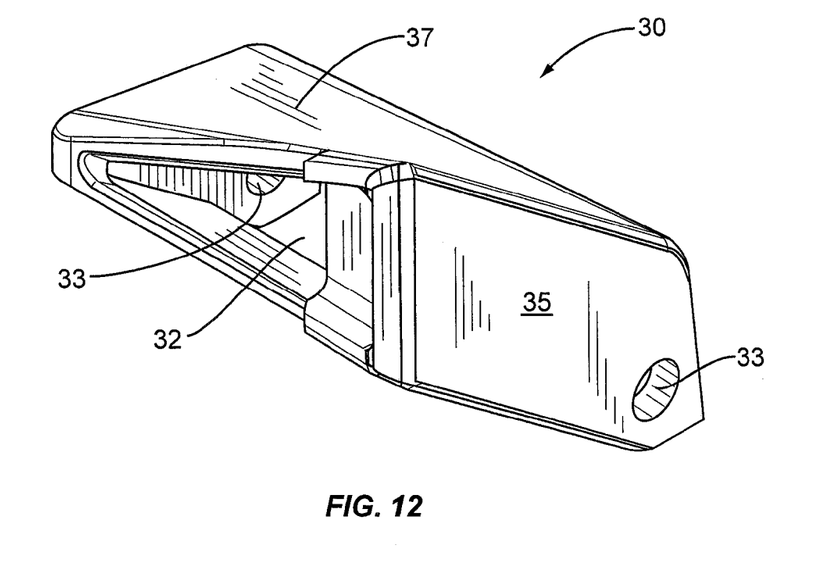
FIG. 12 is a top inboard view of a second guide head portion of the rollout stop shown in FIGS. 1-8.

As shown in FIGS. 11 and 12, the first and second guide heads 30, 40 can be mirror images of each other. Each guide head 30, 40 can include a substantially planar blocking surface 35, 45, and an upper cam surface 37, 47. The inside face of each guide head 30, 40 can include a substantially triangular shaped opening 32, 42 extending therethrough. As further described below, each opening 32, 42 can be configured to receive a laterally extending blocking portion 52, 54 of the retraction pedal 50.

Figure 3:
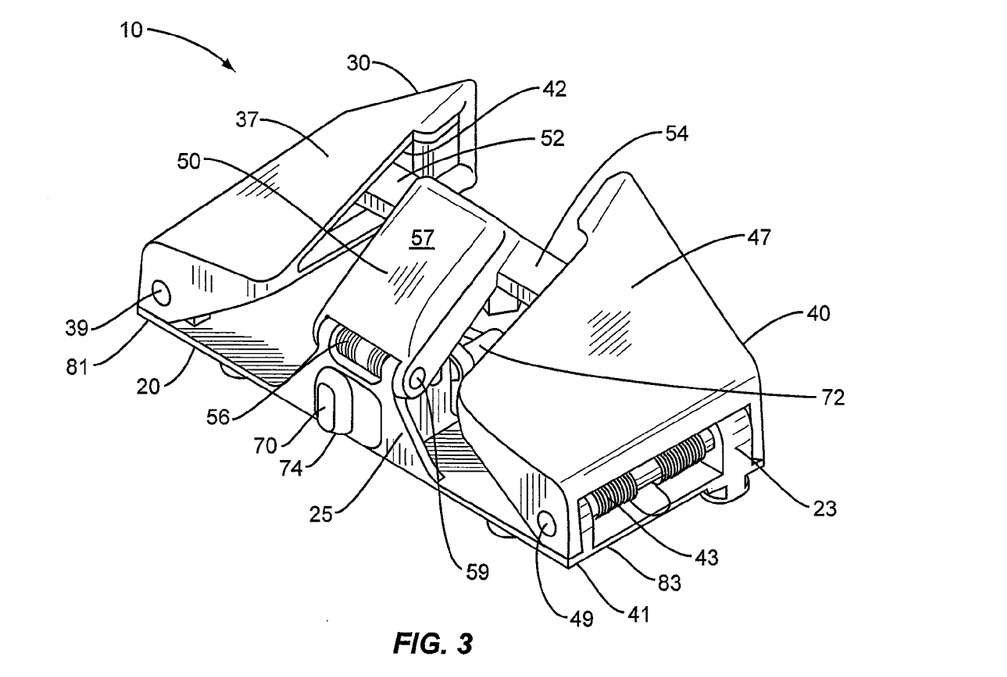
FIG. 3 is a top outboard view of the rollout stop of FIGS. 1 and 2 in a raised, blocking position.
Figure 4:
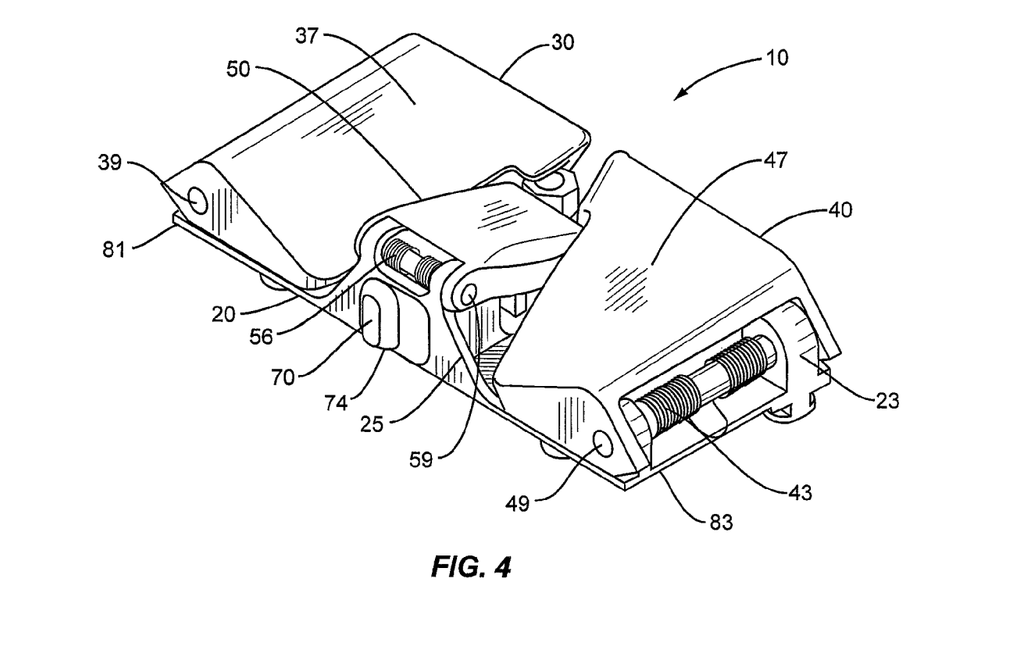
FIG. 4 is a top outboard view of the rollout stop of FIGS. 1-3 in a retracted, non-blocking position.
Figure 5:
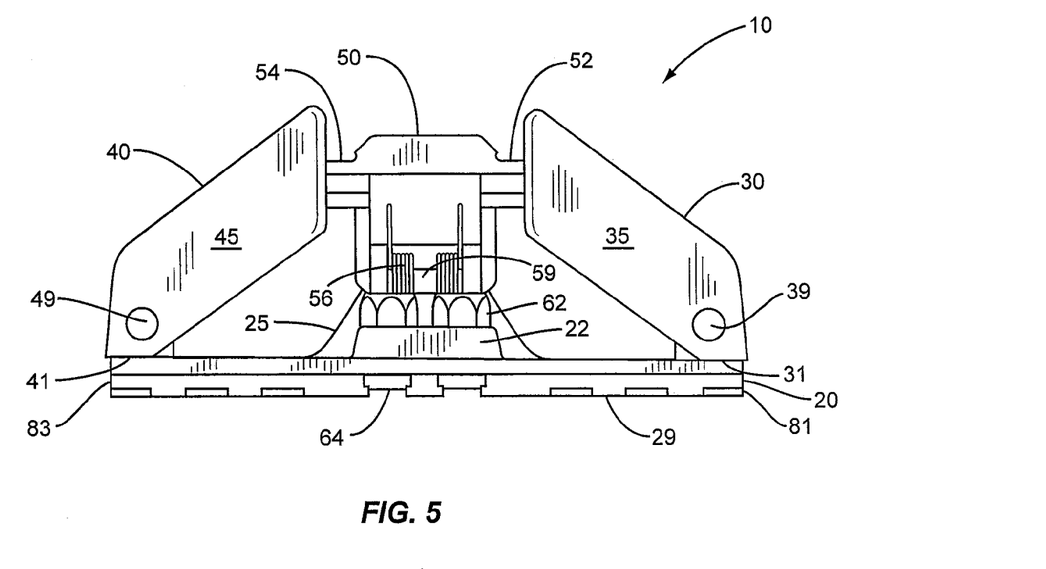
FIG. 5 is an inboard elevation view of the rollout stop of FIGS. 1-4 in a raised, blocking position.
Figure 6:
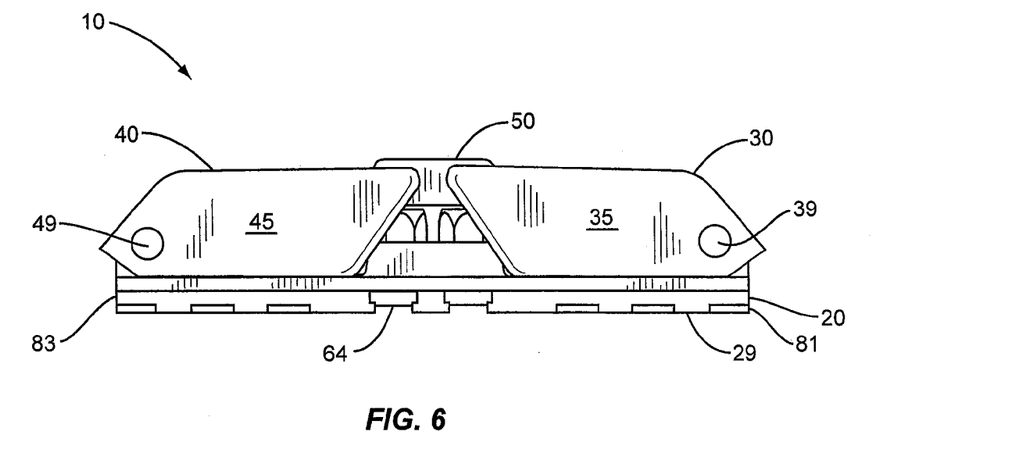
FIG. 6 is an inboard elevation view of the rollout stop of FIGS. 1-5 in a retracted, non-blocking position.
Figure 13:
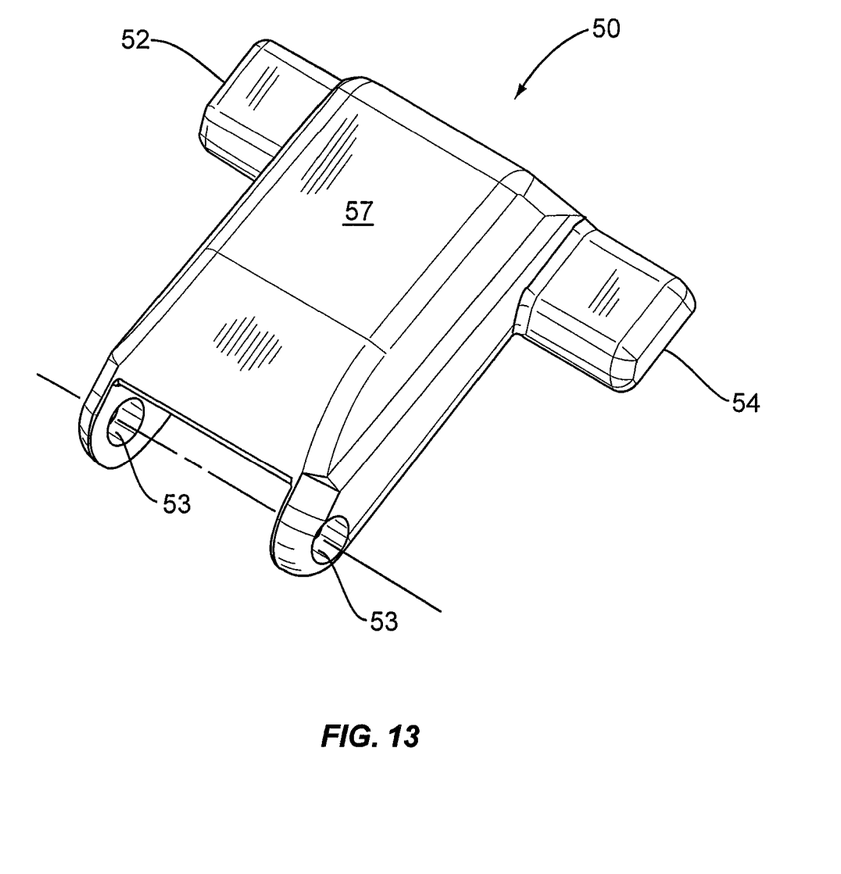
FIG. 13 is a top outboard view of a retraction pedal portion of the rollout stop shown in FIGS. 1-8.

As shown in FIGS. 3-5, the retraction pedal 50 is movably mounted to the base 20. In the embodiment shown, the retraction pedal 50 is pivotally mounted to a bracket portion 23 of the base 20 by a pivot pin 59. Alternatively, the retraction pedal 50 can be movably mounted to the base 20 in any manner that permits upward and downward movement of the pedal 50 relative to the base 20. For example, the pedal 50 can be movably mounted to the base by a linkage system, such as a four-bar linkage system (not shown in the figures). In the embodiment shown in FIGS. 3-5, one or more springs 56 is provided to resiliently force the retraction pedal away from the base 20, and toward its raised position. As seen in FIGS. 1, 3 and 13, the retraction pedal 50 can include an upper pedal surface 57, a first blocking portion 52 that can laterally extend from the pedal 50 in one direction, and a second blocking portion 54 that can laterally extend from the pedal 50 in an opposite direction. As shown in FIGS. 1 and 3, the first blocking portion 52 of the pedal 50 can be received in the triangular-shaped opening 32 of the first guide head 30. Though not shown in the drawings, the second blocking portion 54 of the pedal 50 can be similarly received in the triangular-shaped opening 42 of the second guide head 40. The engagement between the pedal blocking portions 52, 54 and the triangular-shaped openings 32, 42 of the guide heads 30, 40 can be configured such that the retraction pedal 50 and guide heads 30, 40 can necessarily move together between their raised positions shown in FIGS. 1, 3 and 5, and their lowered or retracted positions shown in FIGS. 2, 4 and 6. The blocking portions 52, 54 of the retraction pedal 50 can remain engaged in the openings 32, 42 of the guide heads 30, 40 through their full ranges of rotation, thereby providing a linkage between the guide heads 30, 40 that forces them to move together in concert with movement of the retraction pedal 50.

Figure 10:
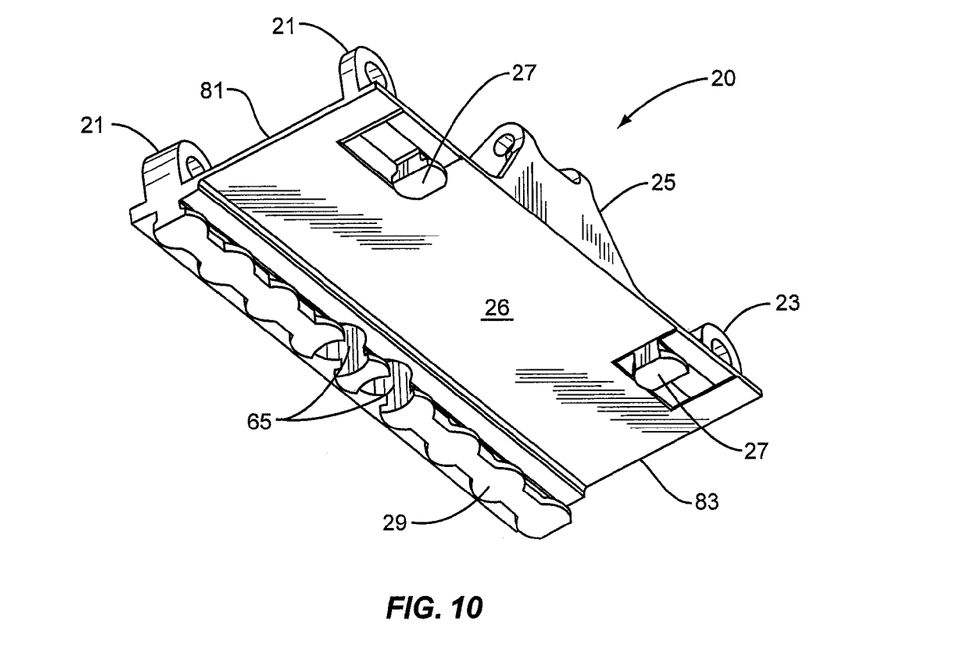
FIG. 10 is a bottom outboard view of the base portion shown in FIG. 9.

As best seen in FIG. 10, the bottom of the base 20 can include a substantially planar lower surface 26, a pair of downwardly depending feet 27, and an elongated series of spaced lobes 29. The feet 27 and spaced lobes 29 are of a type known in the art for mounting items to conventional seat tracks in an aircraft. The feet 27 and lobes 29 can be substantially circular in shape, such that the feet 27 and lobes 29 can be inserted through the spaced circular openings of a pair of conventional parallel aircraft seat tracks (not shown in the drawings). Once inserted, the feet 27 and lobes 29 can longitudinally slide in the bell-shaped grooves of the seat tracks until the base 20 is in a desired position, and the feet 27 and lobes 29 are aligned beneath the vertical restraining tabs of the seat tracks. As shown in FIG. 10, the base 20 can further include one or more anchor openings 65 that align with bolt holes 67 in an anchor block 22 on the top of the base 20. Anchor bolts 62 and buttons 64 of types known in the art can be used to anchor the base to the seat tracks along the sill of an aircraft cargo door.

Figure 7:
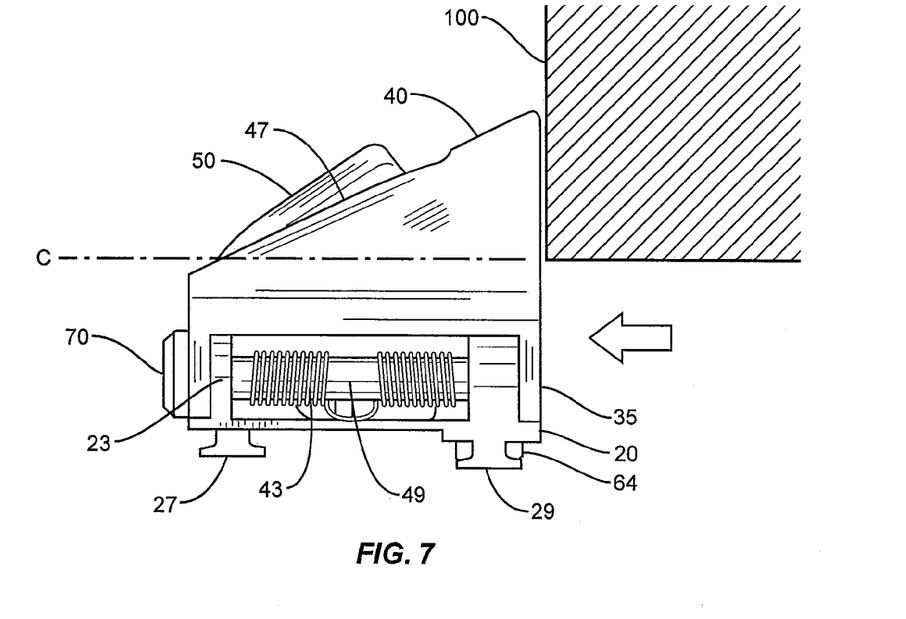
FIG. 7 is a side elevation view of the rollout stop of FIGS. 1-6 in a raised, blocking position
Figure 14:
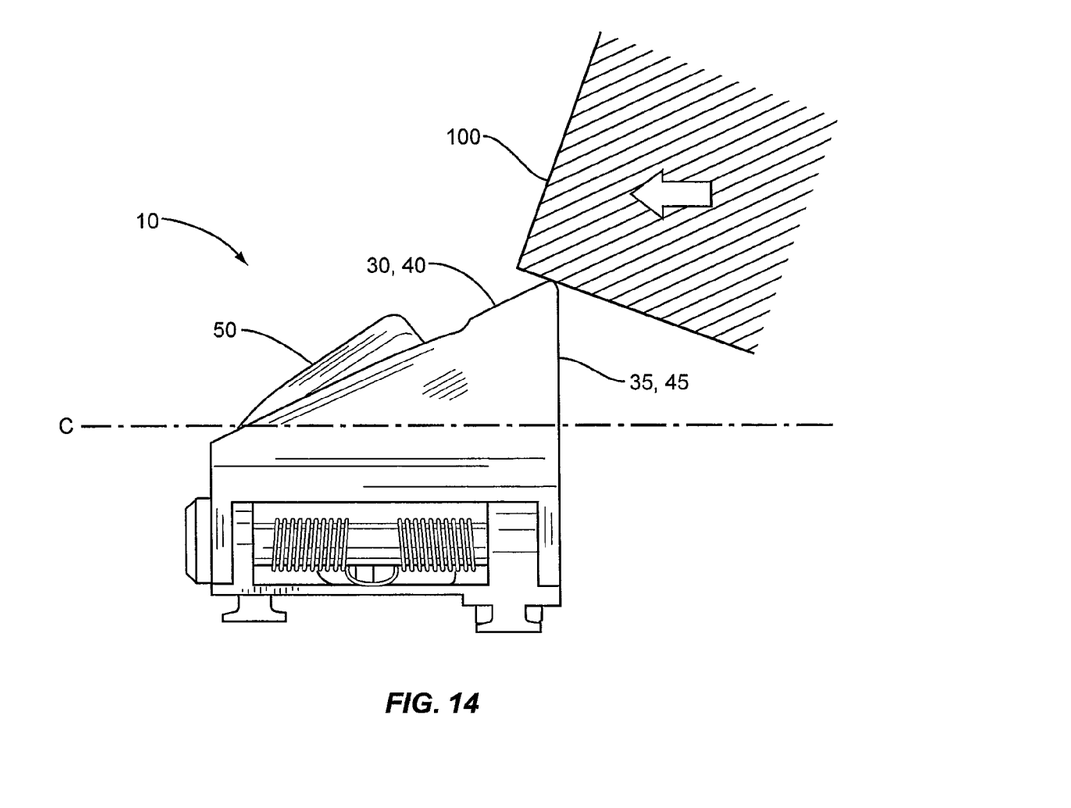
FIG. 14 is a side elevation view of the rollout stop of FIGS. 1-6 in a raised, blocking position with the guide head being contacted by an upwardly warped leading edge of a cargo container or pallet.

The upper cam surfaces 37, 47 of the guide heads 30, 40 and the upper pedal surface 57 of the retraction pedal 50 can be configured such that as the lower leading edge of an inbound ULD reaches the rollout stop 10 and begins to pass over the stop 10, the lower leading edge of the ULD will contact at least portions of the pedal surface 57 and upper cam surfaces 37, 47, thereby downwardly pushing the retraction pedal 50 and the interconnected guide heads 30, 40 beneath the lower surface of the ULD. Accordingly, the ULD automatically overrides the rollout stop 10, and is free to pass over the stop 10 without obstruction during cargo loading. Once the inbound ULD completely passes over the stop 10, the springs 43, 56 return the retraction pedal 50 and the guide heads 30, 40 to their raised positions. As shown in FIG. 7, when the guide heads 30, 40 are in their raised positions, substantial portions of the guide heads 30, 40 extend above the cargo roller plane "C" on which the bottoms of the ULDs travel. Accordingly, the raised guide heads 30, 40 block passage of an outbound ULD 100 that may inadvertently move in an outbound direction as indicated by the arrow in FIG. 7. As shown in FIG. 14, the raised pedal 50 blocks downward movement of the guide heads 30, 40 that might otherwise result from downward contact between the top edges of the guide heads 30, 40 and an upwardly deformed lower edge of a ULD 100. Accordingly, though ULDs can override the upright rollout stop 10 when traveling in an inbound, loading direction, ULDs are effectively prevented from inadvertently overriding the rollout stop 10 when moving in an outbound, exit direction.

Figure 8:
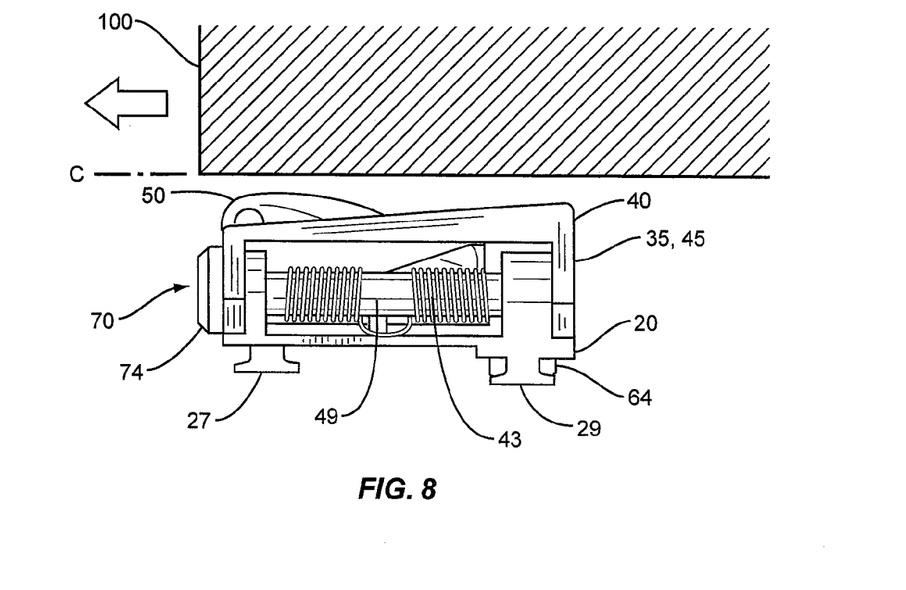
FIG. 8 is a side elevation view of the rollout stop of FIGS. 1-7 in a retracted, non-blocking position.
Figure 9:
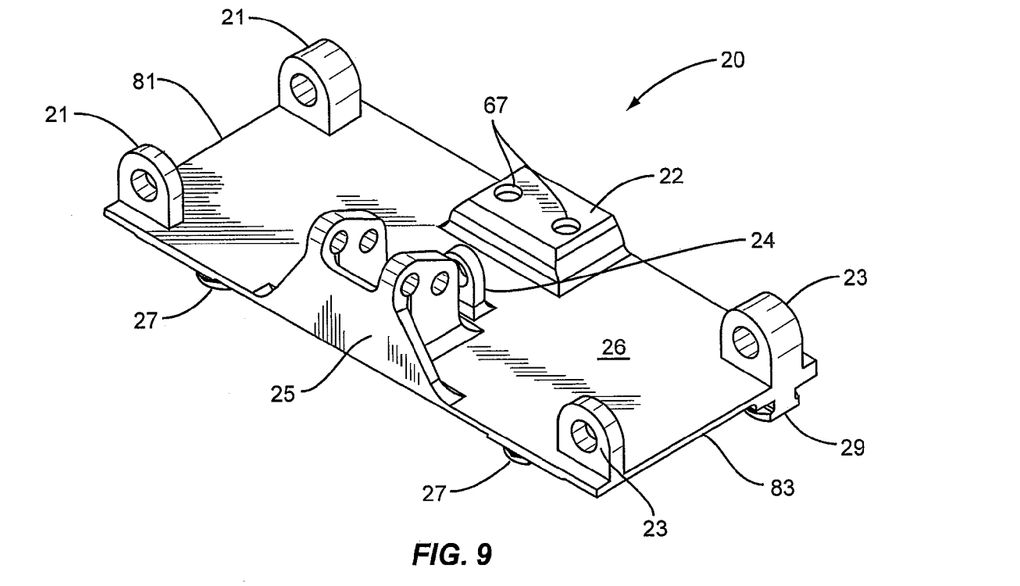
FIG. 9 is a top outboard perspective view of the base portion of the rollout stop shown in FIGS. 1-8.

As shown in FIG. 8, during unloading operations, it is necessary to retract the guide heads from their raised positions in order to permit a ULD 100 to pass over the rollout stop 10 as the ULD exits the cargo hold. In order to restrain the guide heads 30, 40 and interconnected retraction head 50 in the retracted positions shown in FIGS. 2, 4, 6 and 8, the rollout stop 10 can include a latching mechanism 70 that engages and restrains the retraction pedal 50 when the pedal is moved to its retracted position. As shown in FIG. 3, the latch mechanism may include a button 74 engaged with a spring-loaded sliding latch pin 72. As shown in FIG. 9, the base 20 can include a latch pin guide 24 that maintains alignment between the latch pin 72 and the retraction pedal 50. To retract the erected rollout stop 10 shown in FIGS. 1, 3, 5 and 7, a crew person can depress the pedal surface 57 to force the pedal 50 and the interconnected guide heads 30, 40 down to their lowered positions. For example, a crew person can depress the retraction pedal 50 with a foot. Once the retraction pedal 50 is fully lowered, the latch pin snaps into restraining engagement with the pedal 50, thereby preventing the wound springs 43, 56 from pushing the pedal 50 and guide heads 30, 40 back to their raised positions. In order to raise the guide heads 30, 40 to their raised, blocking positions, a crew person can again depress the latch button 74 shown in FIGS. 3-7, thereby disengaging the latch pin 72 from the retraction pedal 50, and permitting the springs 43, 56 to return the retraction pedal 50 and guide heads 30, 40 to their erect, cargo-blocking positions.

Thus, the rollout stop 10 described above provides an apparatus having a relatively simple construction that minimizes the possibility that the rollout stop might be inadvertently overridden by an outbound ULD.

The above description of various embodiments of the invention are intended to illustrate various benefits and aspects of the invention. Persons of ordinary skill in the art will recognize that certain changes and modifications can be made to the described embodiments without departing from the invention. All such changes and modifications are intended to be within the scope of the appended claims.

What is claimed is:

1. A cargo rollout stop comprising:
   (a) a plurality of guide heads each being movable between a blocking position and a retracted position, each guide head having a blocking surface which faces in the same direction in both the blocking position and in the retracted position, the blocking surface configured to block a cargo container from passing over the cargo rollout stop when the guide head is in the blocking position; and
   (b) at least one interconnecting member disposed between the guide heads;
   (c) wherein the interconnecting member is configured to move relative to the guide heads to engage the guide heads and cause them to substantially simultaneously move between their blocking positions and their retracted positions.

2. A cargo rollout stop according to claim 1 wherein the interconnecting member at least partially supports the guide heads in their blocking positions.

3. A cargo rollout stop according to claim 1 wherein the interconnecting member blocks retraction of the guide heads away from their blocking positions when the blocking surface of at least one of the guide heads is contacted by an approaching cargo container.

4. A cargo rollout stop comprising:
   (a) a plurality of guide heads each being movable between a blocking position and a retracted position; and
   (b) at least one interconnecting member disposed between the guide heads;
   (c) wherein the interconnecting member is configured to move relative to the guide heads to engage the guide heads and cause them to substantially simultaneously move between their blocking positions and their retracted positions, and
   (d) wherein each guide head includes a cam surface configured to cause that guide head to move from its respective blocking position towards its respective retracted position as the result of contact between the cam surface of that guide head and a leading edge of an approaching cargo container.

5. A cargo rollout stop according to claim 1 and further comprising a latch operable to secure at least a portion of the guide heads in their retracted positions.

6. A cargo rollout stop according to claim 1 wherein the interconnecting member comprises a pedal movable between a raised position and a lowered position.

7. A cargo rollout stop according to claim 6 wherein the pedal comprises a link to each of the plurality of guide heads.

8. A cargo rollout stop according to claim 7 wherein the links cause the plurality of guide heads to move between their respective blocking positions and their respective retracted positions as the pedal moves between the raised position and the lowered position.

9. A cargo rollout stop according to claim 8 wherein each link comprises an arm that is disposed in an opening in an associated one of the plurality of guide heads.

10. A cargo rollout stop according to claim 7 wherein each link comprises an arm that is disposed in an opening in an associated one of the plurality of guide heads.

11. A cargo rollout stop according to claim 1 further comprising a base to which the plurality of guide heads are movably mounted.

12. A cargo rollout stop according to claim 11 wherein each of the plurality of guide heads moves between the blocking position and the retracted position by pivoting about an axis.

13. A cargo rollout stop according to claim 1 wherein each of the plurality of guide heads moves between the blocking position and the retracted position by pivoting about an axis.

14. A cargo rollout stop according to claim 13 wherein the interconnecting member moves relative to the guide heads by pivoting about an axis distinct from the axes about which guide heads move between the blocking position and the retracted position.

15. A cargo rollout stop according to claim 11 wherein:
the interconnecting member is also movably mounted to the base; and
the interconnecting member moves relative to the guide heads by pivoting about an axis distinct from the axes about which guide heads move between the blocking position and the retracted position.

16. A cargo rollout stop configured to block overhead passage of a cargo container in a first direction of travel and permit overhead passage of a cargo container in a second direction of travel, the second direction being opposite to the first direction, the cargo rollout stop comprising:
(a) a plurality of guide heads each being movable between a blocking position and a retracted position, each guide head having a blocking surface and a cam surface; and
(b) at least one interconnecting member disposed between the guide heads;
(c) wherein the interconnecting member is configured to move relative to the guide heads to engage the guide heads and cause them to substantially simultaneously move between their blocking positions and their retracted positions, wherein:
the blocking surfaces of the guide heads are configured to block overhead passage of a cargo container in the first direction of travel; and
the cam surfaces of the guide heads are configured to permit overhead passage of a cargo container in the second direction of travel, which is opposite to the first direction of travel.

* * * * *